No. 840,527. PATENTED JAN. 8, 1907.
C. M. THOMPSON.
NUT LOCK.
APPLICATION FILED AUG. 20, 1906.

Witnesses
F. G. Campbell
Carl Stoughton

Inventor
Channing M. Thompson
By Shepherd & Parker
Attorneys ately overlies the nut 6 when the parts are in

UNITED STATES PATENT OFFICE.

CHANNING M. THOMPSON, OF NEWARK, OHIO.

NUT-LOCK.

No. 840,527. Specification of Letters Patent. Patented Jan. 8, 1907.

Application filed August 20, 1906. Serial No. 331,245.

*To all whom it may concern:*

Be it known that I, CHANNING M. THOMPSON, a citizen of the United States, residing at Newark, in the county of Licking and State of Ohio, have invented certain new and useful Improvements in Nut-Locks, of which the following is a specification.

My invention relates to nut-locks, and has for its object the provision of a nut-lock which will effectually retain a nut in position upon a bolt against all ordinary strain, jar, or vibration.

Further objects and advantages of the invention will be set forth in the detailed description which now follows.

Figure 1:
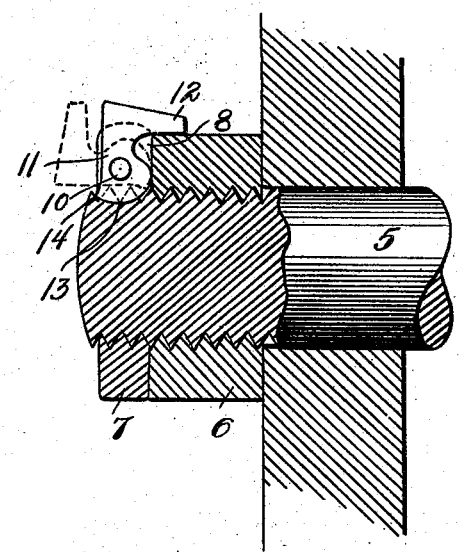
Figure 2:
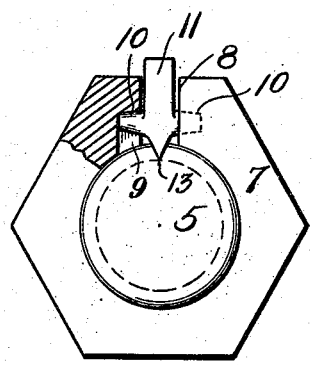

In the accompanying drawings, Figure 1 is a vertical section of a nut-lock constructed in accordance with the invention and illustrating the same in position to retain a nut upon a bolt, and Fig. 2 is a front elevation of said nut-lock with a portion thereof broken away.

Like numerals designate corresponding parts in both figures of the drawings.

Referring to the drawings, the numeral 5 designates the threaded end of an ordinary bolt, and the numeral 6 designates an ordinary nut threaded upon said bolt. Threaded upon the outer end of the bolt is a split nut or washer 7, which is angularly formed for the reception of a wrench or like tool. This nut or washer is split at 8 and recessed upon each side of said split portion, as indicated at 9, for the reception of the trunnions 10 of a retaining-dog 11. This retaining-dog has a rearwardly-extending tongue 12, which partially overlies the nut 6 when the parts are in the position illustrated in full lines in Fig. 1. At its lower edge the dog 11 is provided with cutting-face 13, which terminates in a nose 14.

The operation of the device is as follows: The nut 6 having been screwed firmly into position, the dog 11 is thrown to the dotted-line position illustrated in Fig. 1, after which the nut or washer 7 is screwed upon the bolt 5 until it abuts against the outer face of the nut 6. The dog 11 is then driven to the full-line position shown in Fig. 1 by striking the tongue 12 with a hammer. This causes the nose 14 and the cutting-face 13 of the retaining-dog to bite into the threads of the bolt, it being apparent that this will effectually prevent rotation of the nut or washer 7 with relation to the bolt, which will in turn prevent rotation of the nut 6.

By referring to Fig. 1 it will be seen that the distance from the center of the trunnions 10 to the tip of the nose 14 is slightly greater than the distance from the center of said trunnions to the cutting-face 13. The result of thus forming the dog 11 is to cause the split washer to slightly spread when the nose 14 first bites into the metal of the bolt. After the dog has been driven into the position illustrated in full lines in Fig. 1 this nose acts as a cam to retain said dog in that position, for it is apparent that any retrograde movement of the dog could only be accomplished by the nose 14 biting deeper into the metal, or else the contact of said nose with the bolt would cause the nut to again spread.

From the foregoing description it will be seen that simple and efficient means are herein provided for accomplishing the objects of the invention; but while the elements shown and described are well adapted to serve the purposes for which they are intended it is to be understood that the invention is not limited to the precise construction set forth, but includes within its purview such changes as may be made within the scope of the appended claims.

What I claim is—

1. A nut-lock comprising a threaded resilient split nut, a retaining-dog pivoted in the split portion of said nut, said dog having a cam-shaped cutting edge which is adapted to cut into the threads of the bolt upon which the nut is screwed and which lies in longitudinal alinement with said bolt, the resiliency of the nut tending to hold said dog in its locking position.

2. In a device of the character described, the combination with a threaded resilient split nut, of a retaining-dog pivoted in the split portion of said nut and having a cam-shaped cutting edge which is adapted to bite into the threads of a bolt, said dog lying in longitudinal alinement with said bolt, and an inwardly-extending tongue carried by said dog which is adapted to rest upon an adjacent nut when said dog is in its locking position.

In testimony whereof I affix my signature in presence of two witnesses.

CHANNING M. THOMPSON.

Witnesses:
C. C. M. CRUDER,
E. M. BAUGHER.